US011328314B2

United States Patent
Michel et al.

(10) Patent No.: US 11,328,314 B2
(45) Date of Patent: May 10, 2022

(54) CONTEXT-AWARE SYSTEMS AND METHODS FOR SELECTING SMARTPHONE APPLICATIONS/SERVICES AND AWARDING REWARD POINTS

(71) Applicant: ZMBIZI APP LLC, Dover, DE (US)

(72) Inventors: Samuel P. Michel, Coconut Creek, FL (US); Alpesh Patel, Old Basing (GB); Stephen J. Brown, Malibu, CA (US)

(73) Assignee: ZMBIZI APP LLC, Dover, DE (US)

( * ) Notice: Subject to any disclaimer, the term of this patent is extended or adjusted under 35 U.S.C. 154(b) by 47 days.

(21) Appl. No.: 16/874,360

(22) Filed: May 14, 2020

(65) Prior Publication Data

US 2021/0357966 A1    Nov. 18, 2021

(51) Int. Cl.
*G06Q 30/02* (2012.01)
*G06K 9/62* (2022.01)
*G06Q 20/36* (2012.01)
*G06F 3/04817* (2022.01)
*G06F 16/2457* (2019.01)

(52) U.S. Cl.
CPC ..... *G06Q 30/0224* (2013.01); *G06F 3/04817* (2013.01); *G06F 16/24578* (2019.01); *G06K 9/6215* (2013.01); *G06Q 20/36* (2013.01)

(58) Field of Classification Search
CPC .................................................. G06Q 30/0224
See application file for complete search history.

(56) References Cited

U.S. PATENT DOCUMENTS

| 8,041,956 B1 * | 10/2011 | White ............... G06K 9/00073 713/186 |
| 9,003,327 B2 | 4/2015 | Moshrefi et al. |
| 9,405,848 B2 | 8/2016 | Liang et al. |
| 9,769,634 B2 | 9/2017 | Marti et al. |

(Continued)

FOREIGN PATENT DOCUMENTS

| CA | 2872051 A1 * | 11/2013 | ............... G06F 8/30 |
| WO | WO-2021045730 A1 * | 3/2021 | ............... G03H 1/04 |

OTHER PUBLICATIONS

Extreme Machine News, "Worlds First Holographic Smart phone screen Technology", https://youtu.be/qijY5ryqZm8, Jan. 20, 2018, Youtube, San Bruno, CA, USA.

(Continued)

*Primary Examiner* — Scott C Anderson
(74) *Attorney, Agent, or Firm* — Asif Ghias (57) ABSTRACT

Systems and methods are disclosed for providing context-aware selection and recommendation of applications and services on a mobile device. The selection of the preferred applications is based on the context of the user and the context of the applications. A comparison engine related to a recommendation module performs a similarity computation between context attribute vectors of the user and the applications. Based on the similarity computation, a rank-order is produced that determines in what order the application icons should be presented to the user. A digital wallet is also disclosed that maintains the reward points awarded to the user based on the instant principles. Unlike prevailing techniques, the reward points are awarded in a context-aware manner after reconciling the conflicting or contradictory usage habits of the user.

20 Claims, 8 Drawing Sheets

(56) References Cited

U.S. PATENT DOCUMENTS

| | | | |
|---|---|---|---|
| 10,176,518 B2* | 1/2019 | Kamm | G06Q 30/0643 |
| 10,325,277 B1 | 6/2019 | Ballepu | |
| 10,332,184 B2 | 6/2019 | Glover | |
| 2003/0122954 A1* | 7/2003 | Kassatly | H04N 9/0451 |
| | | | 348/335 |
| 2009/0163183 A1 | 6/2009 | ODonoghue et al. | |
| 2013/0238413 A1 | 9/2013 | Carlson et al. | |
| 2013/0339345 A1 | 12/2013 | Matamala et al. | |
| 2014/0074569 A1 | 3/2014 | Francis et al. | |
| 2016/0189196 A1* | 6/2016 | Huh | G06Q 30/0267 |
| | | | 705/14.31 |
| 2016/0191450 A1* | 6/2016 | Lineberger | G06Q 30/0241 |
| | | | 709/206 |
| 2017/0168653 A1 | 6/2017 | Spiess et al. | |
| 2018/0152736 A1* | 5/2018 | Alexander | H04N 21/41407 |
| 2018/0253727 A1* | 9/2018 | Ortiz | G06Q 20/325 |
| 2020/0374243 A1* | 11/2020 | Jina | H04L 51/02 |

OTHER PUBLICATIONS

Sinues et al, "Human Breath Analysis May Support the Existence of Individual Metabolic Phenotypes", PLOS ONE, https://doi.org/10.1371/journal.pone.0059909, Apr. 3, 2013, pp. 1-6, PloS one, 8(4), p. e59909., San Francisco, CA, USA.

Universitat Zurich, "Biomarker and Disease", https//www.hochschulmedizin.uzh.ch/de/projekte/zurich-exhalomics/projekt-details/biomarker.htm, Hochschulmedizin Ziirich—Zurich Exhalomics, Feb. 4, 2019, pp. 1-4, University of Zurich, Zurich, Switzerland.

Universitat Zurich, "Technology Development", https://www.hochschulmedizin.uzh.ch/de/projekte/zurich-exhalomics/projekt-details/technologieentwicklung.html, Hochschulmedizin Ziirich—Zurich Exhalomics, Feb. 4, 2019, pp. 1-3, University of Zurich, Switzerland.

VIVID-Q, "Projecting a desktop anywhere you like", http://vivid-q.com/, Apr. 27, 2020, pp. 1-17, Vivid-Q, London, UK.

Zenobi Group, "Ambient Mass Spectrometry", https://zenobi.ethz.ch/research/ambient-mass-spectrometry.html, Jan. 28, 2020, pp. 1-3, Zenobi Group, Zurich, Switzerland.

Zenobi Group, "Fundamentals of Mass Spectrometry", https://zenobi.ethz.ch/research/MSMechanisms.html, Jan. 28, 2020, pp. 1-3, Zenobi Group, Zurich, Switzerland.

Zenobi Group, "Nanoscale Analysis", https://zenobi.ethz.ch/research/nanoscale-analysis.html, Jan. 28, 2020, pp. 1-3, Zenobi Group, Zurich, Switzerland.

Zenobi Group, "Noncovalent Interactions", https://zenobi.ethz.ch/research/noncovalent-interactions.html, Jan. 28, 2020, pp. 1-3, Zenobi Group, Zurich, Switzerland.

* cited by examiner

CONTEXT-AWARE SYSTEMS AND METHODS FOR SELECTING SMARTPHONE APPLICATIONS/SERVICES AND AWARDING REWARD POINTS

FIELD OF THE INVENTION

This invention is related to the field of contextually selecting most relevant applications on a mobile device for a user and for awarding reward points to the user based on context.

BACKGROUND OF THE INVENTION

The tagline of the modern world of smartphone-mediated services is "there's an app for that." Applications have proliferated to the extent where smartphone users are overwhelmed with the choices of potential applications and services from a greater variety of vendors, and these applications are never integrated in a cohesive manner and/or curated manner. As most merchants and service providers prompt users at every opportunity to engage through their own proprietary applications, the fragmentation continues to increase. As vendors target users with their advertising and promotion in the interest of selling or engaging in their applications while harvesting user data through their proprietary interfaces, users often wonder who is looking out for their interests. Therefore, there is a strong desire to personalize the experience of a user on the mobile device and put the user in control of the entire experience.

There is plenty of prior art that attempts to address the above desire. U.S. Pat. No. 9,769,634 issued on 19 Sep. 2017 to Marti et al. describes methods and computer products that provide personalized content based on historical interaction with a mobile device. A computing device can receive information about a user interaction with an application running on the mobile device at a first time and location. A type of the application can be identified by parsing a description of the application (e.g., using a natural language processing algorithm). An affinity model can be generated that associates the type of the application with the first time and/or location. At a second time and location, it can be determined that the second time corresponds to the first time and/or that the second location corresponds to the first location. Using the affinity model, the second time and/or location can be associated with the type of the application, and the mobile device may then display content related to the type of the application.

U.S. Pat. No. 9,003,327 issued on 7 Apr. 2015 to Moshrefi et al. describes a system that may include a computing device configured to provide a proactive user interface, the proactive user interface configured to selectively propose suggested actions when a user of the computing device is determined to be in a passive mode. The computing device may include a proactive user interface module configured to: wait for at least one event, determine whether trigger criteria are met based on the at least one event, and when the trigger criteria are met, propose a suggested action to the user based on the at least one event.

U.S. Pat. No. 10,332,184 issued on 25 Jun. 2019 to Glover describes a system that includes a recommendation module. The recommendation module may receive a recommendation request including a set of installed application identifiers and identify a set of candidate application groups including at least one matching candidate application identifier. For each candidate application group, the recommendation module may determine a recommendation score based on a number of matching candidate application identifiers included in the candidate application group that match at least one installed application identifier. The recommendation module may select a first candidate application group based on the recommendation scores and select at least one non-matching candidate application identifier from the first candidate application group that does not match any of the installed application identifiers, resulting in a set of recommended application identifiers. The recommendation module may transmit to the user device, recommendation data for at least one recommended application identified by the set of recommended application identifiers.

U.S. Pat. No. 9,405,848 issued on 2 Aug. 2016 to Liang et. al describes techniques for recommending mobile device activities, such as accessing mobile applications and/or mobile Web pages. Some embodiments provide an Activity Recommendation System ("ARS") configured to recommend relevant activities for a user to perform with a mobile device, based on context of the mobile device. In one embodiment, the ARS recommends mobile applications-based content items (e.g., Web pages, images, videos) that are being currently accessed via the mobile device. The ARS may process information about mobile applications and content items to determine semantic information, such as entities and/or categories referenced or associated therewith. The ARS may then use the semantic information to determine mobile applications that have semantic information that is at least similar to that of a content item accessed via a mobile device.

U.S. Pat. No. 10,325,277 issued on 18 Jun. 2019 to Ballepu describes systems and methods for providing rewards to a user. Providing rewards to the user may include receiving transaction data associated with a user's purchase, determining a merchant and a category associated with the transaction data, and assigning the transaction data to a merchant icon or a badge icon in a graphical user interface. The merchant icon or the badge icon may comprise a progress bar that indicates the user's progress in reaching a milestone associated with the icon. Based on the transaction data, a number of loyalty points of a number of transaction points may be assigned to the merchant icon or the badge icon, respectively. Further, based on whether a total number of loyalty points exceeds a first threshold or a total number of transaction points exceeds a second threshold, a reward may be generated to the user when the first or second threshold is exceeded.

U.S. Patent Publication No. 2009/0163183 A1 to O'Donoghue et al. describes a method for generating recommendations for a user of a mobile device. The user is associated with a service provider. A request for a recommendation is obtained. Data associated with the user and data on the content available to the user is retrieved from the service provider. A list of recommendations is generated based on an analysis of the retrieved user data. The recommendations are generated by a plurality of different recommendation techniques.

U.S. Patent Publication No. 2017/0168653 A1 to Spiess et al. describes a system in which a situation description is received from a context engine, the situation description describing a context of a user. The user is associated with a graphical user interface, and the graphical user interface is associated with a screen area. A user interface adaptation rule is identified based on the received situation description. A logical layout is determined based on the identified user interface adaptation rule. A physical layout is determined based on the logical layout. Display of the graphical user interface on the screen area is initiated based on the determined physical layout.

U.S. Patent Publication No. 2013/0339345 to Matamala et al. describes mobile devices that can provide app recommendations that are relevant to a location of interest. A localized app recommendation can be triggered (e.g., by a mobile device coming within a threshold distance of an application hotspot or some other user action). A location of interest can be determined. The location of interest can be the current location of the mobile device or another location (e.g., the destination in a mapping app). Using the location of interest, a localized application ranking database with app hotspot data can be queried with location data representing the location of interest. App recommendations can be received and displayed on the mobile device. Icons for apps that are relevant to the location of interest can be visually distinguished from other apps.

U.S. Patent Publication No. 2013/0238413 to Carlson et al. describes a mobile device that is configured with a mobile application to direct a user to a location of more interest to the user based on benefits of offers provided to the user. The mobile application may be configured to capture an image of an offer presented in an advertisement via a digital camera, identify the offer from the image, and store data associating the offer with one or more accounts of the user. The mobile application is configured to present information to suggest a direction of travel to the user for improved opportunities to take advantage of the offers.

U.S. Patent Publication No. 2014/0074569 to Francis et al. describes systems and methods for facilitating loyalty and reward functionality in mobile commerce. In one embodiment, a method for providing a loyalty/reward program can include receiving an indication that a consumer has entered a predefined merchant location; transmitting a notification to a mobile device associated with the consumer; providing one or more payment tools on a mobile device for the consumer to facilitate a purchase from a merchant associated with the predefined merchant location; generating a loyalty/reward credit for an account associated with the consumer; and receiving an instruction from the consumer to redeem loyalty/reward credit for goods and/or service from the merchant.

What is missing from the prior art are techniques for curating and contextually selecting from the multitude of available applications and presenting only the most relevant applications to the user. The applications may be preloaded on the device or added by the user. What is also missing are techniques of contextually rewarding the user for his or her usage or non-usage of applications and services, not merely in a simplistic manner, but in a wholistic, reconciled or integrated manner regardless of the user activity being performed, including searching, shopping, messaging, capturing content, sharing, or any other activity.

OBJECTS AND ADVANTAGES

In view of the shortcomings of the prior art, it is an object of the present invention to provide techniques for recommending or selecting the most relevant applications on a mobile device for the user, whether the applications are preloaded or later added by the user.

It is also an object of the invention to determine the relevance of an application for the user based on a user context and the application context.

It is further an object of the invention to determine a rank-order of the applications for the user based on context and present the most relevant applications to the user first.

It is also an object of the invention to provide a digital wallet and award reward points to the user based on his/her usage and non-usage of the applications in a wholistic and integrated manner.

These and other objects and advantages of the invention will become apparent upon reading the detailed specification and reviewing the accompanying drawing figures.

SUMMARY OF THE INVENTION

A number of objects and advantages of the invention are achieved by apparatus and methods designed for context-aware techniques of selecting smartphone applications/services and providing rewards to the user. The user as well as the applications or services resident/installed on the mobile device are characterized by a context. A user context is based on one or more of spending history, usage/behavior history, location of the user, profile of the user, etc. Conversely, an application context is based on the importance of various user activities and behavior while using that application. User and application contexts are represented by respective context attributes.

In the preferred embodiment, appropriate weights are assigned to various user and application context attributes. The above task is done by a context assignor and weighting module. Preferably, the context attributes which may be weighted are represented as vectors. A comparison engine determines the similarity between the user context attribute vector and application context attributes vectors using techniques known in the art. The comparison engine is preferably a part of a recommendation module or at least communicatively coupled with it.

Based on the above similarity computation performed by the comparison engine, the recommendation module produces a rank-order that is provided to an interface module. The interface module uses the rank-order to determine the order of presenting/presentation of the application icons on the display of the mobile device for the user. The preferred/selected icons may be presented sequentially or alternatively in a toggled or alternating manner. Thus, the applications are presented to the user in the order of their relevance/context for the user and not in an arbitrary and disorganized manner. This is one of the main contributions of the present technology over the prior art. The relevance of the applications thus presented may be amongst all applications on the device or within categories of applications, such as shopping, dining, health, messaging, social media, etc.

There is also a digital/rewards wallet/module that is in charge of tracking the reward points awarded by the instant system to the user. The reward points are awarded based on the usage of various applications and the spending/purchase behavior/habits of the user while using the applications. In this manner, the instant digital wallet maintains the instant reward points for the user based on the reward points awarded to him/her by the underlying constituent applications/services.

As another contribution of the present technology over the prior art, the instant award points in the digital wallet are not merely awarded to the user based on the sum or accumulation of the reward points from the underlying applications. Instead, they are awarded in a reconciled or integrated manner. What this means is that the instant reward points are awarded after reconciling sometimes conflicting behavior or habits of the user. As one example, the user may be awarded reward points redeemable at a healthcare provider, if the user has refrained from dining excessively at unhealthy fast-food chains, and vice-versa. The reward points in the digital wallet can also be converted to a cash value. The cash value may be applied to a debit card, a credit card or any other financial services application that may be linked to the digital wallet. The cash value on a debit card may then be withdrawn from the user at an automatic teller machine (ATM).

Preferably, the weights of the user and application context attributes discussed above are assigned by a human curator. This assignment may done in a supervised, semi-supervised and unsupervised machine learning manner. Preferably, the weights are further based on user preferences, existing value of reward points in the digital wallet and the sponsorship or promotion of a certain application/service by its vendor/provider.

There is a large number and types of applications/services for mobile devices that may be installed on the mobile device and that may benefit from the present teachings. These include messaging applications, shopping applications, entertainment/games applications, restaurant applications, weather applications, transportation applications, social networking applications, banking applications, education applications, healthcare applications, insurance applications, etc.

The present techniques may be implemented by an appropriate apportionment of functionality in the frontend or device-based, and backend portions. Clearly, the system and methods of the invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
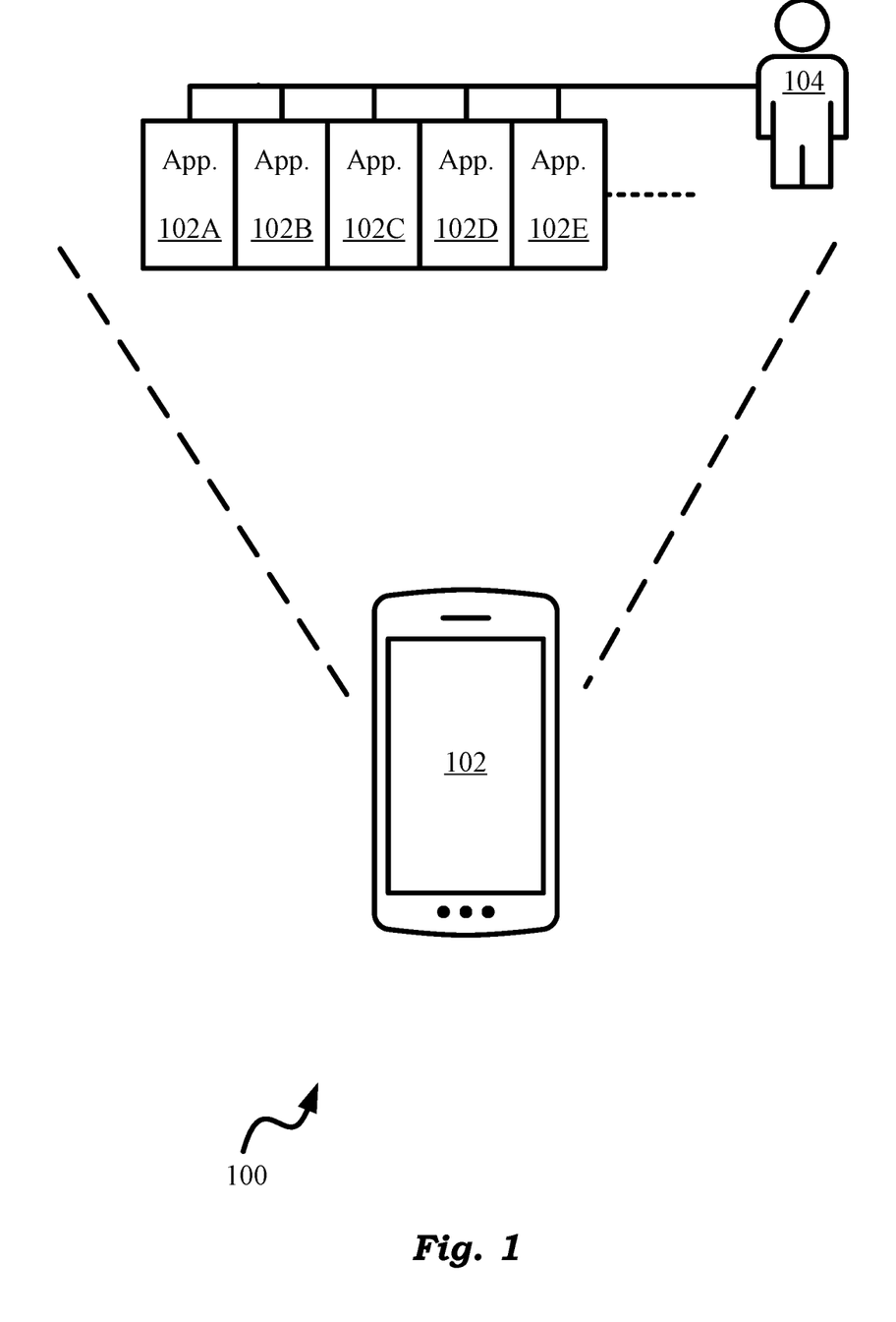
FIG. 1 illustrates at a high-level a mobile device on which various applications/services are installed by/for the user that can benefit from the instant design.

The techniques described herein may employ computer code that may be implemented purely in software, hardware, firmware or a combination thereof as required for a given implementation. The present invention will be best understood by first reviewing the systems and methods for providing a context-based or context-aware or contextual access to applications on a mobile device for a user as illustrated in FIG. 1. FIG. 1 shows an embodiment 100 of the present technology with a mobile device 102, such as a cellular phone, a smart-phone, a personal digital assistant (PDA), a tablet device (such as an iPad), a laptop, or any other suitable personal computing device used by a user 104 as shown.

There are a number of applications, such as applications, 102A, 102B, 102C, . . . installed on mobile device 102. These applications or services may have been preinstalled on device 102 by the device vendor or installed by user 104 over the lifetime of the device for various purposes and benefits, perceived or real, for the user. As noted in the Background section above, the number of such applications/services on the device rises dramatically over the lifetime of the device. Very commonly, the applications have confusingly overlapping functionalities making it extremely hard for the user to derive an optimal experience from the device and from the various applications/services installed on it. The present design solves this problem based on techniques provided herein.

Figure 2:
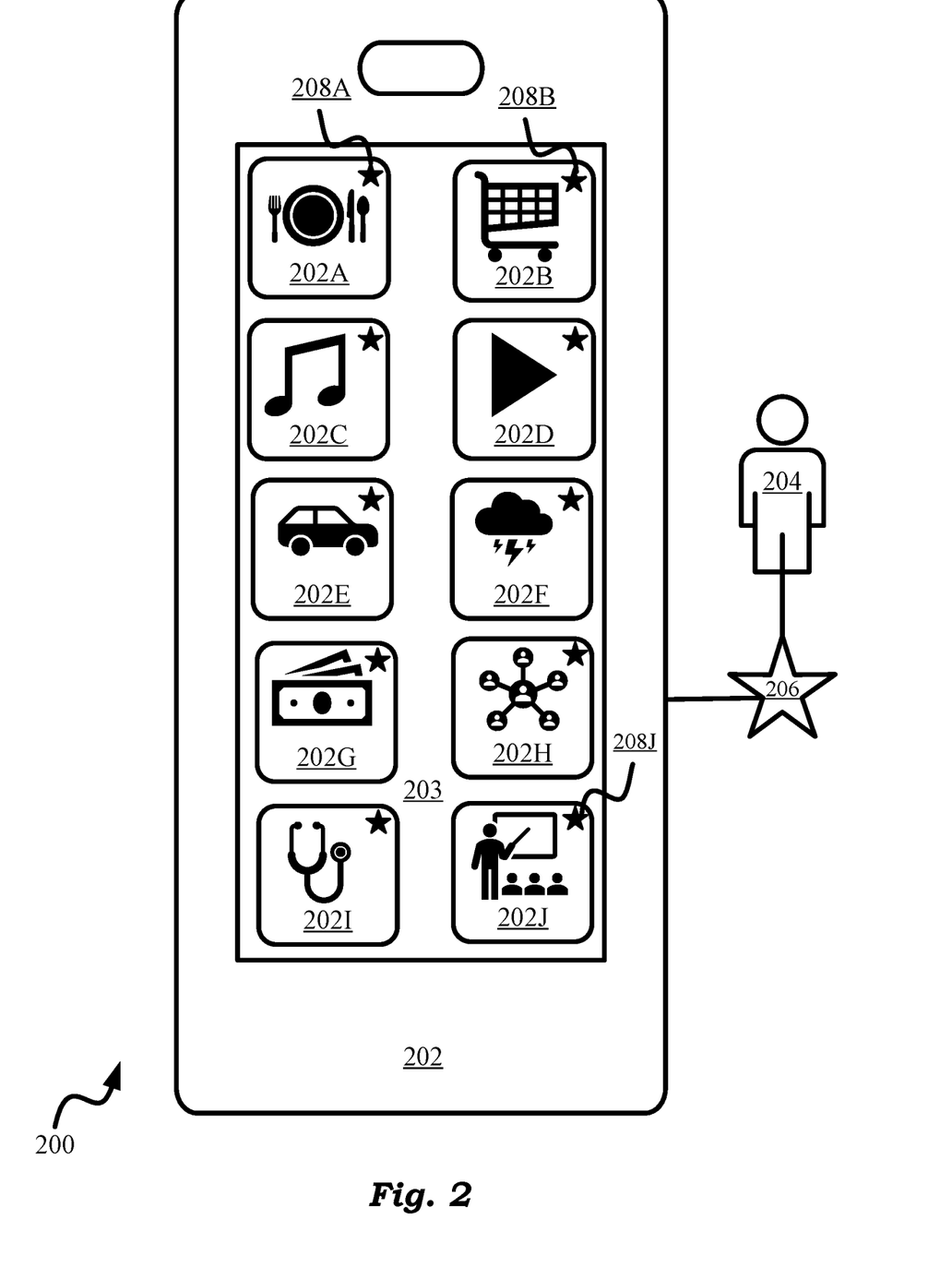
FIG. 2 represents a user and selected exemplary applications on the mobile device based on the user and application contexts of the present principles.

To understand the principles behind the present design in greater detail, let us now turn our attention to the embodiment shown in FIG. 2. Embodiment 200 of FIG. 2 shows a smartphone 202 and its user 204. Smartphone 202 is of a slightly different style as compared to smartphone 102 shown in FIG. 1. Nevertheless, just as device 102, there are various applications presented to user 204 by various icons on display 203 of smartphone 202. Specifically, there is an application 202A that is used to make dining reservations at various restaurants. Examples of application 202A include Opentable™, BookaTable™, Yelp™, etc. There is a shopping or an e-commerce application 202B, examples of which include Amazon.com™, Walmart.com™, etc. There is a music application 202C, examples of which include iTunes™, Spotify™, Pandora™, etc.

There is also a video or movies application 202D, such as Netflix™, Youtube™, Hulu™, etc. There is further a transportation application 202E, such as Uber™, Lyft™, etc. There is a weather application 202F, such as Apple's stock weather application, The Weather Channel™, etc. There is a banking application 202G, that is provided by the banking institution that user 204 banks with. There is a social networking application 202H, such as Facebook™, Twitter™, LinkedIn™, etc. There is a healthcare provider application 202I such as BlueCross and Blue Shield™, Kaiser Permanente™, etc. There is an education or learning application 202J, such as Lumosity™, Khan Academy™, DuoLingo™, etc. Furthermore, there may be other applications below or above or right or left of the icons shown on display 203 of FIG. 2, that user 204 may have to scroll or swipe to view.

According to the chief aspects, applications 202A, 202B, . . . are presented to user 204 in a ranked-order manner. In other words, as opposed to the application icons appearing in any order as chosen by the operating system of device 204, such as in an alphabetical order, or in the order of their installation, the icons of applications on device 202 are presented based on their relevance to the behavior of user 204. This is one of the key innovative aspects of the present technology. Explained further, a subset of overall applications on device 202 is recommended to be presented first or on the top page or home screen of display 203 of device 202 for user 204. The recommendation of which application icons should be presented first is made by a recommendation module of the instant design.

The recommended application may be from amongst all the applications on the mobile device or from within a category of applications. For example, the recommendation module may select the top-ranking shopping application, the top-ranking dining application, the top-ranking health application, and the-top ranking financial/money application based on the user context. These top-ranking applications may further be selected based on the context. For instance, exemplary money applications may include a rewards application, a loan application, a credit score application, etc. They may further include a savings or points conversion application that converts points to rewards that can be redeemed in another shopping application or to cash that can be redeemed at an ATM with a debit card or another card linked to the rewards wallet.

The recommendation module accomplishes its objects by matching a "context" of user 204 to the "contexts" of applications 202A, 202B, . . . on device 202. Such a user context of the present context-aware technology is shown by star 206, while the application contexts for applications 202A, 202B, . . . are shown by respective stars 208A, 208B, . . . in FIG. 2. This matching of contexts between the user and the applications is in turn governed by a matching of the various attributes of the user context to the attributes of the application contexts. This is illustrated in FIG. 3.

Figure 3:
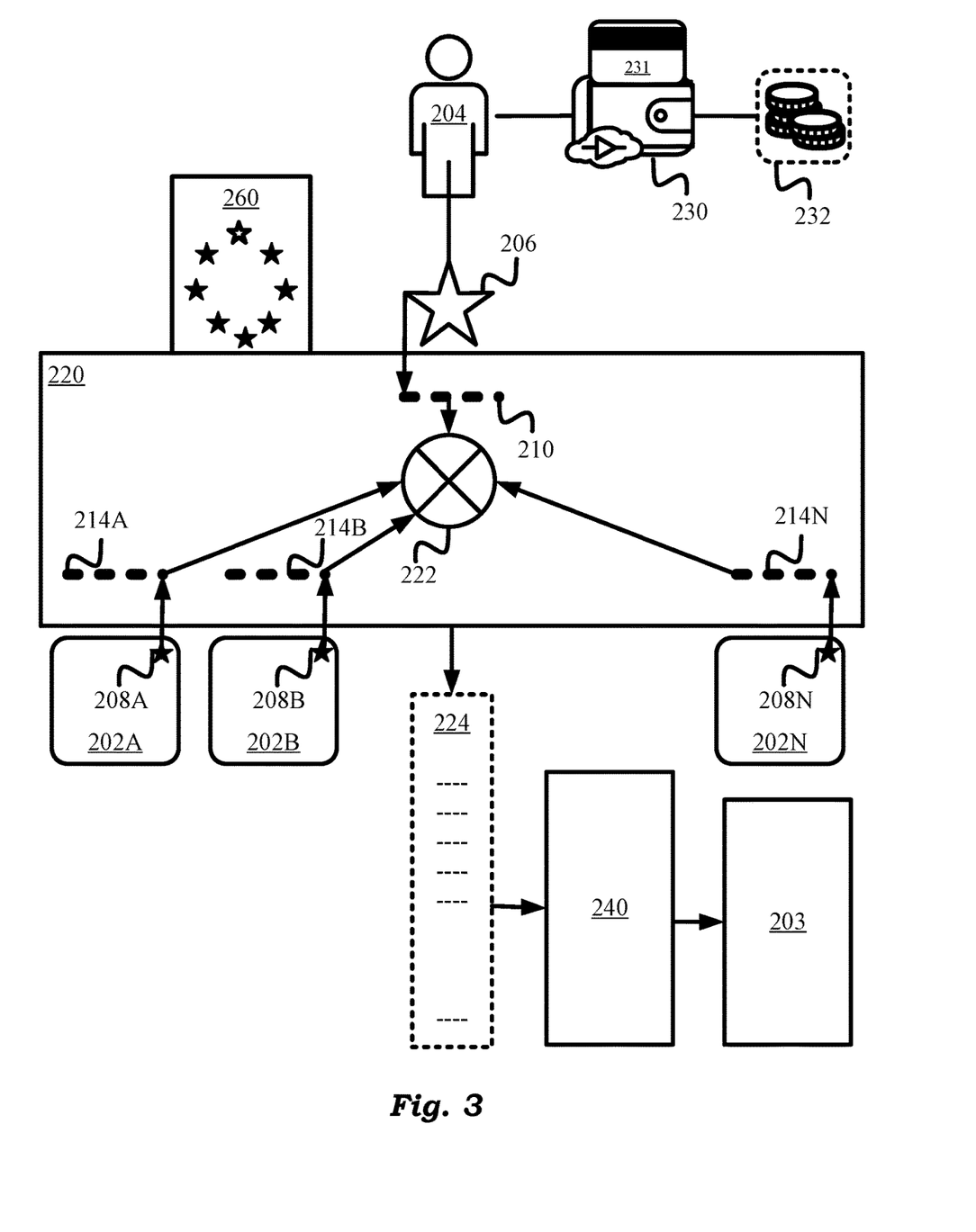
FIG. 3 represents in detail the key component modules of the present design working together to produce a rank-order for the applications/services on the mobile device.

FIG. 3 shows a recommendation module 220 of the present design that compares contexts 206 of user 204 with contexts 208A, 208B, . . . 208N of applications 202A, 202B, . . . 202N respectively. As discussed above, the result is the derivation of a rank-order 224 for applications 202A, 202B, . . . 202N as shown. Note that in FIG. 3 applications 202A-N represent any number and types of applications installed on device 204 of FIG. 2. These include messaging applications, shopping applications, entertainment/games applications, restaurant applications, weather applications, transportation applications, social networking applications, banking applications, education applications, healthcare applications, insurance applications, etc.

Device 204 is not explicitly shown in FIG. 3 to avoid clutter. Furthermore, applications or services 202A-N may be just virtual or also have a physical or brick-and-mortar component. In other words, while a restaurant application may have a corresponding physical establishment or restaurant, a social networking application may purely be virtual.

Rank-order 224 derived by recommendation module 220 is then used by an interface module 240 of the present design to present application icons on display 203 of device 202 in a sequential or prioritized manner for user 204. Because of interface module 240 the user is able to choose (such as by highlighting a given icon via touching or arrow keys) and subsequently use a given application. Rank-order 224 may dictate that banking application 202G should be presented first to user 204 while music application 202D last on the home page display 203, while for another user healthcare application 202I may be displayed first.

Of course, the rank-order may determine the order of presentation of all applications on device 202, even those that come on the second page above/below (or to the side) of the home page. Rank-order 224 preferably has a cutoff value that marks the end of the selected or preferred applications for user 204, and after which the applications icons are not presented to the user by interface module 240. To access those applications beyond the rank-order cutoff, user 204 may have to exit the present system and resort to the traditional interface of device 202.

In another embodiment, instead of showing application icons sequentially, interface module 240 displays the icons alternatingly or in a "toggled" or an alternating manner. In such an embodiment, one or more icons of the recommended or preferred subset of applications as determined by rank-order 224 above are presented to the user in a time-based loop of the icons of the selected applications.

Let us now further understand the workings of recommendation module 220 shown in FIG. 3. Context 206 of user 204 is represented as a vector/set of attributes 210 as shown. The context attributes include spending habits/history of user 204, usage habits/history i.e. how much time the user dwells (user attention) in a given physical or virtual space of a given service/application, the location information of the user and an account profile or simply profile of the user. The location information may include his/her present location as well as location history as appropriate. The profile may include his/her date of birth, place of residence, name/alias, present status, etc.

While the physical location discussed above may be derived based on a location sensor on the device, a virtual location may also be ascribed to the user based on his/her activities, whether current or scheduled in the future. Examples of such activities include video conferencing or viewing the streaming of an event, or visits to locations within a game environment or a virtual reality environment. A user may not be physically present at a given physical location such as a store, live entertainment event, or health clinic, but may be participating in such a store or event or clinic virtually through teleconferencing, virtual reality or telehealth. Such a virtual location may then be weighted just as a physical location would be amongst the context attributes of the user per present teachings. Exemplary meetings, streaming and events platforms that may provide such a virtual location context include Zoom™, Google Meet™, Microsoft Teams™, WhatsApp™, Verizon BlueJeans™, Facebook™ Messenger, etc.

In yet another embodiment, the user profile is based on the authentication of the user of the device by a biometric identification and authentication, including face recognition, fingerprint, or acoustic or chemical breath print. These biometrics contribute to the user profile as the biometrics used for identification may also contain other data that can classify the user. For example, facial recognition technology may confirm the identity of the user, but may also be used to classify mood. Breath recognition may be used to confirm user identity, but may also contain classifiable signals to indicate stress, exercise or other health parameters. Such a biometrically generated profile may then be used to define user context attributes and their weights per present teachings.

Applications 202A-N also have respective context attributes 208A-N represented by respective vectors/sets of attributes 214A-N as shown. To accomplish its objective of producing rank-order 224, recommendation module 220 utilizes a comparison engine 222. Comparison engine 222 compares context attributes vector 210 with context attributes vectors 214A-N to determine a similarity. For this purpose, comparison engine 222 may employ one of the many techniques of vector similarity computation known in the art, such as Cosine similarity or distance-based similarity. Regardless, the end result is that a rank-order 224 is produced, whose first entry identifies the application that is to be displayed first for user 204, and second entry identifies the second application, and so on.

In a preferred embodiment, user context attributes and application context attributes are weighted. As such, user attributes vector 210 and application attributes vectors 214A-N contain weighted attributes. The weights may be assigned by a human curator. In such, or a related embodiment, the human curator may provide these inputs to the system in a supervised machine learning manner. Alternatively, the weights may be assigned completely automatically in an unsupervised machine learning manner. The task of determining relevant contexts for the user and the applications as well as assigning weights to the contexts is performed by a context assignor or a context assignor and weighting module 260 a shown in FIG. 3. Module 260 may be either be integrated with recommendation module 220 or be external to and communicatively coupled with it. Similarly, comparison engine 222 may be apart of recommendation module 220 or communicatively coupled with it. Moreover, there may be a separate machine learning engine/module for learning the weights to be assigned to the context attributes via context assignor module 260.

In other related variations, the user attributes and their weights may also be based on a promotion from a vendor and/or on the existing value of reward points in the digital wallet of the user further discussed below. In other words, a specific application vendor or service provider may promote its application to rank higher than others. Similarly, if the user has a very high value of reward points from a specific application/service then that application/service may be ranked higher than others. Existing value of reward points thus provide a way of contextualizing the immediate or next actions of the user for ranking the relevance of the selected/preferred applications and services.

The weights may also be based on the choosing (or selection) of the preferred/selected applications presented by interface module 240 for subsequent usage by user 204. Explained further, the weights are so assigned that if user 204 repeatedly ignores a high-ranked application, then the weights for the context attributes for that application are reduced. This results in a lowering of its rank in rank-order 224 in the future iterations of presentation by interface module 240. On the other hand, if the user consistently chooses a lower-ranking application for usage, then its weights are adjusted so it is ranked higher in the future iterations.

As noted, the context attributes capture the behavior, habits and preferences of user 204 while she/he is using a given application 202A-N. These attributes may also include the user profile, including the name, data of birth and a specific status message associated with the user and existing value of reward points from various applications/services associated with the user. These may include shopping, dining and other preferences, such as whether the user prefers shopping at Walmart™, and if so what departments and products he/she typically shops, his/her shopping history and patterns, or whether he/she prefers eating at a McDonald's, and if so what typically he/she orders, how he/she typically pays, and so on.

Figure 4:
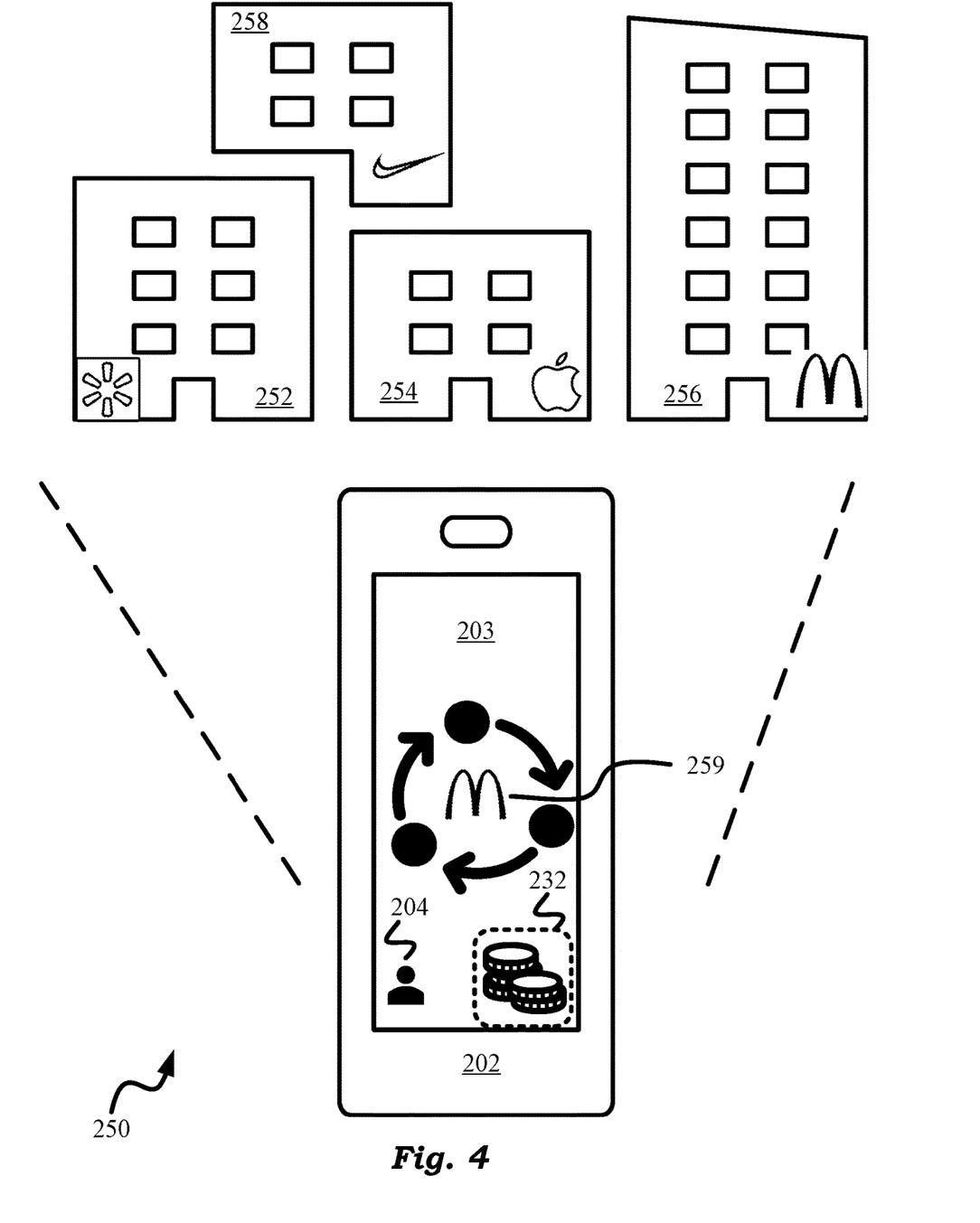
FIG. 4 illustrates exemplary usage habits of a user at some familiar establishments and associated applications/services.

The application context against which the user context is matched, can be thought of as the converse of the user context. As such, an application context determines the relative importance of various user activities and behavior while using that specific application. In other words, for a dining application, the application context attributes may include the specific restaurant location the user prefers to dine in, the menu items he/she typically orders, forms of payment etc. FIG. 4 explicitly illustrates the usage behavior of the user 204 at some familiar establishments, namely a Walmart™ store 252, an Apple™ store 254, a McDonald's™ restaurant 256 and a Nike™ store 258. FIG. 4 further shows that user 204 is using the McDonald's service/application 259 on display 203 from a cash value 232 assigned to his rewards points, as further discussed below.

It should be noted that the applications/services 202A-N as shown in FIG. 2-3, from various application vendors and service providers incentivize user 204 for the usage of their applications/services as per the prevailing art. As the user uses their applications/services he/she is awarded reward points that the user may then redeem at the same establishments or partner establishments and in some cases convert to cash. However, based on its context-aware design, the present technology integrates/reconciles these reward points and awards its own reward points to the user based on his/her behavior. In other words, the present design awards its own rewards points to user 204 in a digital wallet 230 shown in FIG. 3. The digital wallet may be linked to a physical and/or virtual debit card, credit card or another financial service. An exemplary debit/credit card 231 is shown in FIG. 3 that with cash value 232 loaded on it. Such a card may then be used at a point-of-sale (POS) terminal for shopping and/or for withdrawing cash from an ATM.

These rewards points of the present technology are in turn based on the reward points accumulated by the user from his/her usage of the various application/services installed on device 202. However, the reward points in digital wallet 230 are not merely a simplistic accumulation or sum of all other underlying reward points. Instead, they are awarded in a wholistic or integrated manner after reconciling the shopping/spending and usage behavior (context) of the user, which in some cases may be based on contradictory or conflicting or mutually exclusive choices.

As an example, if a healthcare application is ranked high in the selected/preferred subset of applications/services for the user, then the present technology may award reward points to the user for not dining at an unhealthy fast-food establishment. In other words, user 204 of FIG. 3 may be awarded reward points in his/her digital wallet 230 for having a low/no value of reward points from a fast-food restaurant application/service. In other words, the user is awarded reward point for refraining from a purchase or service. This is indeed one of the unique aspects of the present design. As provided herein, the present design thus provides a curating capability for the plethora of mobile device applications by selecting only the most relevant applications for the user. They further provide this curating capability by awarding instant reward points wholistically across the many applications with sometimes conflicting user behavior.

The instant approach of awarding reward points in this manner is wholistic because the eating habits of the user are relevant to his/her healthcare costs and relatedly insurance premium. In embodiments assigning weights to context attributes, the eating and lifestyle preferences of the user are thus weighted high/more for healthcare and health insurance applications/services. As a result, based on the comparison of weighted attributes by comparison engine 222 of FIG. 3, a user that has an unhealthy dining and lifestyle habits, may have his/her healthcare and insurance applications rank higher than other applications in rank-order 224.

As already noted, user 204 is assigned a digital or rewards wallet 230 as shown in FIG. 3. Rewards wallet 230 is a module that may be implemented separately from recommendation module 220 or it may be integrated with it. As user 204 uses/shops various applications/services 202A-N on device 202, or refrains therefrom per above, he/she is awarded reward points in digital wallet 230 as discussed above. The reward points in digital wallet 230 are designated a suitable cash value 232 based on appropriate business rules. The cash value may be in any suitable currency, such as United States dollars. Subsequently, user 204 may then apply this cash value towards the purchase of more products and services from applications 202A-N on device 202.

Most typically, the more user 204 uses an application, such as for shopping, downloading music/movies, dining, etc. the more reward points he/she is awarded from these underlying constituent applications. In yet other embodiments, the reward points provided by these underlying applications and services are themselves awarded based on the context-aware principles of the present design. In other words, as user 204 uses applications 202A-N based on his/her lifestyle choices, the accrual of reward points from one application may result in a dwindling or decrease of reward points from another. This concept was introduced in an exemplary scenario above where the instant reward points were being awarded to the user by reconciling the reward points from the underlying applications/services. However, the same principles can be extended to the underlying applications/services themselves.

Explained further, if a user accumulates many reward points from fast-food chains, then this knowledge may indicate to an insurance carrier that the user has a higher risk of disease and medical bills. This provision of the knowledge of reward points between constituent underlying applications of the present design may be afforded by a suitable integration layer based on techniques known in the art. Consequently, the carrier may decide to increase the premium for user 204 on its insurance application on device 202 or from other retail channels of the insurance provider. Alternatively or in addition, the carrier may also effect its punitive action on user 204 by reducing the number of reward points awarded to the user from his/her use of the insurance application.

The present technology and its various modules may be implemented in a number of variations. Recommendation module 220, comparison engine 222 and context assignor and weighting module 260 will have frontend portions/components that are installed on mobile device 202 and bankend portions/components that are implemented in an application server behind the cloud. To facilitate the understanding of the implementation design of the preferred embodiment of the present technology better, FIG. 5 shows the frontend or device-specific components while FIG. 6 shows the backend components.

Figure 5:
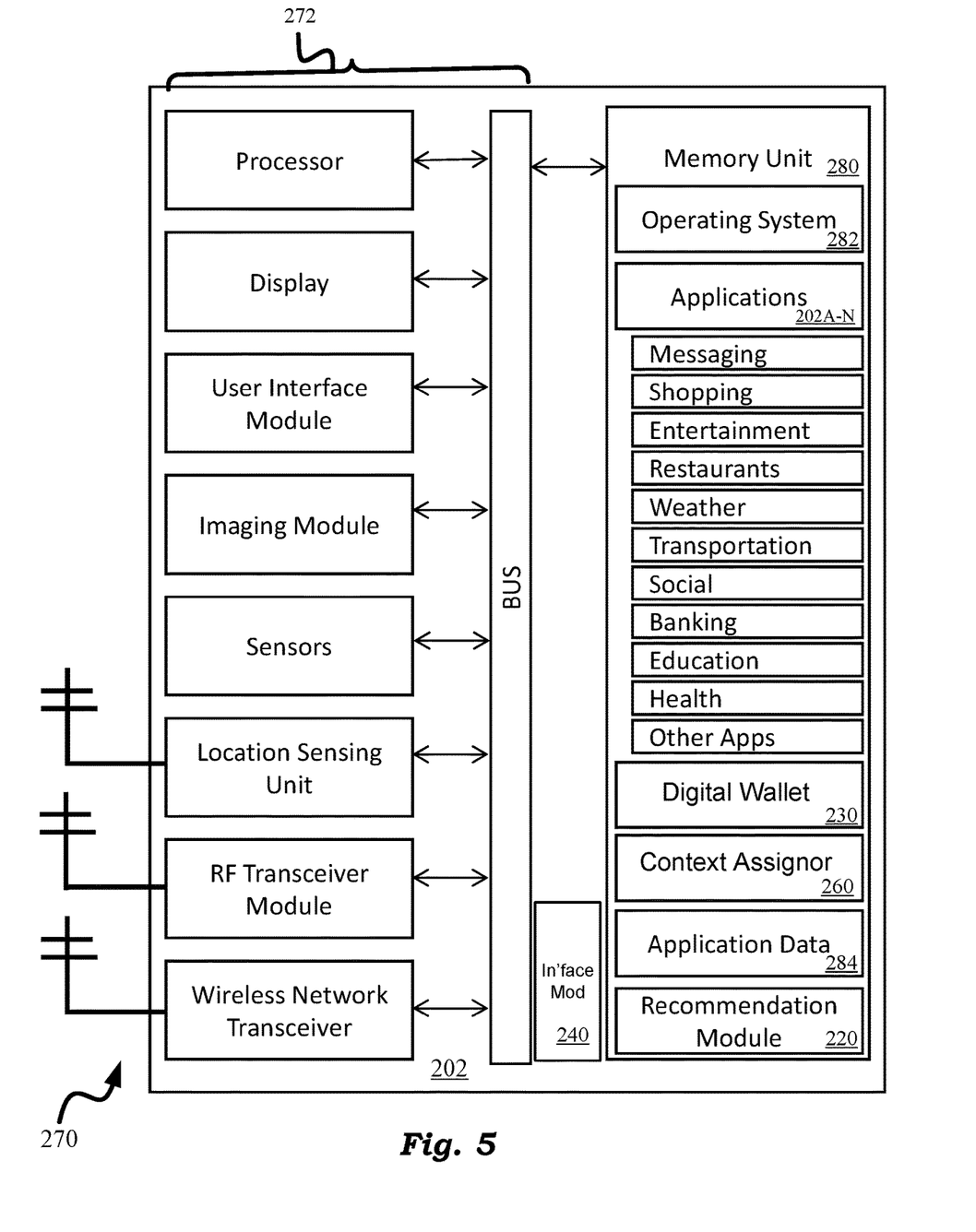
FIG. 5 provides a block diagram view of the frontend components/portions of the key modules of an exemplary implementation of the present teachings.
Figure 6:
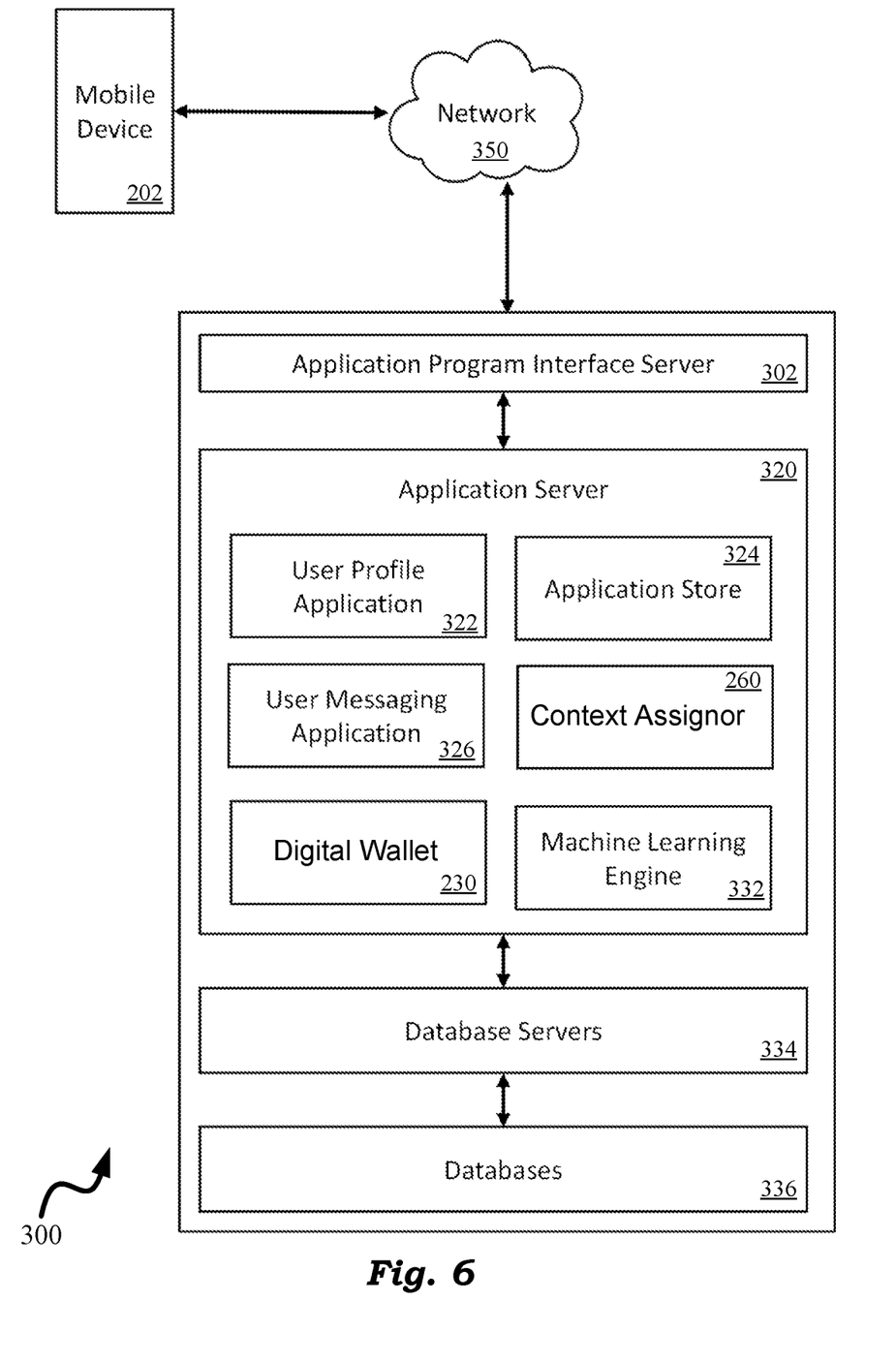
FIG. 6 provides a block diagram view of the backend components/portions of the key modules of an exemplary implementation of the present teachings.

More specifically, FIG. 5 shows in a block diagram view 270 mobile device 202 of FIG. 3 with the various frontend portions/components of a preferred implementation. Brace labeled with reference numeral 272 on the left shows the typical modules and components of mobile communication device 202, these are well known and not discussed further for brevity. Components specific to or related to the above teachings of the present design are shown on the right. The righthand side shows a memory unit 280 with an operating system 282, such as an Android™ OS or and Apple™ iOS, and various exemplary applications 202A-N discussed above. Other operating systems may include Sailfish, KaiOS, Xiaomi, Samsung Tizen. In addition, the mobile device may be a smart phone, tablet, smart watch, computer, wearable device or an embedded device.

FIG. 5 also shows the frontend portion of digital wallet 230 of FIG. 3. Also shown is the frontend portion of context assignor and/or weighting module 260 in charge of maintaining/assigning the context attributes of the user and applications on device 202 as discussed above. Frontend application data module 284 is in charge of maintaining and storing all data related the applications on the backend as discussed below. Recommendation module 220 of FIG. 3 is also shown in FIG. 5 that works in conjunction with the digital/rewards wallet 230 and context assignor 260 as discussed above.

Finally, also shown is our interface module 240 that works in concert with comparison engine 220 (not shown in FIG. 5 to avoid clutter) and recommendation module 220 to display/present the icons of applications 202A-N on device 202 for the user in a rank-ordered manner and for subsequent choosing/usage of the applications. There may be other frontend components added or removed from FIG. 5 based on the requirements of a given implementation but within the scope of the present teachings.

Now, let us pay or attention to the backend components of the preferred implementation as illustrated in FIG. 6. FIG. 6 shows the backend components in a block diagram view 300. It also shows our mobile device 202 from earlier drawing figures and explanation connected to backend 300 via network or cloud or internet 350. Specifically, backend 300 consists of an application program/programming interface (API) server that presents the functionality of the backend as API's over the cloud to client mobile devices, using techniques known in the art. In turn API Server 302 is communicatively coupled with an application server 320 that houses the key functionality of the backend. Of course, backend 300 executes on one or more hardware systems and platforms or servers with their own microprocessors and memory. The architectural techniques for hosting backend 300 are well known in the art and not explicitly discussed in this disclosure.

The backend functionality housed or implemented by application server 320 consists of a user profile application 322 in charge of maintaining the user profile and related context information in database(s) 336 and database server(s) 334. There is an application store 324 from which the user may purchase/install additional applications/services on device 202. There is a user messaging application 326 in charge of providing alerts and messages to the user via the frontend display of device 202. Note that the frontend messaging/alert application on display 203 of device 202 for user 204 in FIG. 3 was not explicitly discussed but is presumed to exist.

Application server 320 also houses the backend portion of context assignor and/or weighting module 260 of FIG. 3 and FIG. 5. The backend portion is responsible for storing and retrieving user and application context information and any associated weights from database(s)/server(s) 336/334 of backend 300. There is further the backend portion of digital wallet 230 of FIG. 3 and FIG. 5 that is in charge of storing and retrieving reward points for the user from the backend database(s) and database server(s) 336 and 334 respectively.

Finally, there is also shown a machine learning engine 332 that is responsible for learning weights for context attributes maintained by context assignor 260 based using a learning process.

The learning process involves training the engine based on the user and application contexts, which are in turn based on the usage behavior of the user and the corresponding capabilities of the applications respectively per above teachings. As noted above, the learning and assignment of weights to the contexts by learning engine 332 may be performed in a supervised, semi-supervised or completely unsupervised manner. Note that any corresponding frontend portion of machine learning engine 332 was not explicitly discussed in our discussion of the frontend but is presumed to exist.

Based on the above principles, the present technology thus provides a context-aware design for recommending/selecting a preferred/selected set of applications of a mobile device user, and to award reward points that reconcile conflicting and mutually exclusive behavior of the user on the mobile device. Based on user and application contexts, the present principles thus provide techniques for curating the multitude of available products/applications/services that have proliferated on users' mobile devices.

Figure 7:
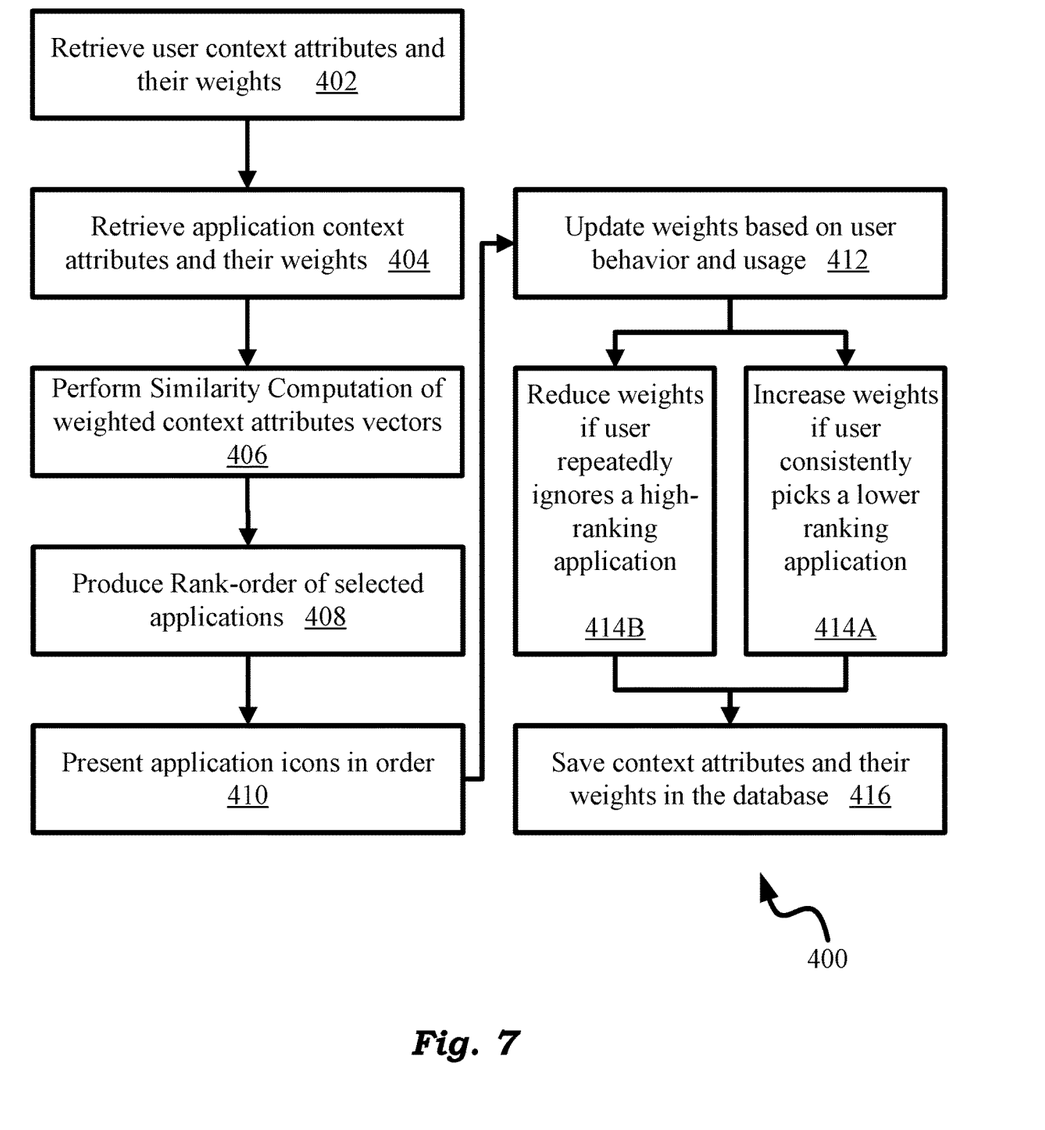
FIG. 7 shows in a flowchart form the steps performed by a preferred embodiment for assigning and updating the weights of context attributes vectors for presenting selected applications to the user.

FIG. 7 presents the process of comparison of user context attributes and application context attributes for a preferred embodiment in a flowchart form. While still referring back to FIG. 3, FIG. 5 and FIG. 6, flowchart 400 shows that our context assignor and weighting module 260 first retrieves weighted user context attributes 210 from database(s)/server(s) 336/334 per above. This is shown by step/box 402. Next, module 260 retrieves weighted application context attributes 214A-N as shown by step/box 404. The order of steps 402 and 404 may be switched or they may be performed in parallel.

Next our comparison engine 222 performs similarity computation between the weighted user context attributes vector and weighted application context attributes vectors. This is shown by box/step 406. This results in the creation of rank-order 224 by recommendation module 220, as indicated in flowchart 400 by step/box 408. At this stage, the rank-order is fed to interface module 240 that uses it to present the selected/preferred applications to the user per above. This is shown by step/box 410.

Next, as shown by step/box 412, the weights are continually updated and learned based on the behavior of the user with respect to the various applications. This includes basing the weights on user preferences, usage patterns, existing value of reward points, sponsor promotions, etc. per above teachings as well as the use of machine learning engine 332 also per above teachings.

Moreover, the weights are also updated based on the choice/choosing (selection) or usage of the applications by the user. As the user chooses (selects) or ignores the various applications from the display, the weights of the context attributes vectors of the applications are adjusted, as further captured by box/step 412. If the user shows a preference for a lower-ranking application, then its context attributes weights are increased. Conversely, if the user consistently ignores a high-ranking application, then its context attributes weights are decreased. These steps are respectively shown by boxes 414A and 414B. As discussed above, this adjustment of weights based on usage will result in the improvement of the rank of the chosen application and in the lowering of the rank of the ignored and application. Ultimately, the updated weights along with the context attributes vectors are saved in database(s)/server(s) 336/334 of FIG. 6 per above.

As noted, and while referring back to FIG. 3, interface module 240 is in charge of displaying the icons of the selected/preferred applications on display 203. In a prior embodiment, the icons were displayed either sequentially or in an alternating or a toggled fashion. However, in a variation, interface module 240 displays the icons in a circle. More specifically, the highest-ranking recommended/preferred application icon is shown in the center of the circle, while preferred categories of the applications are shown around the periphery of an outer circle that has an indicator movable around the circumference. The user may accelerate the cycling through the applications by touching a different part of the circle or by sliding a finger around the circle.

Figure 8:
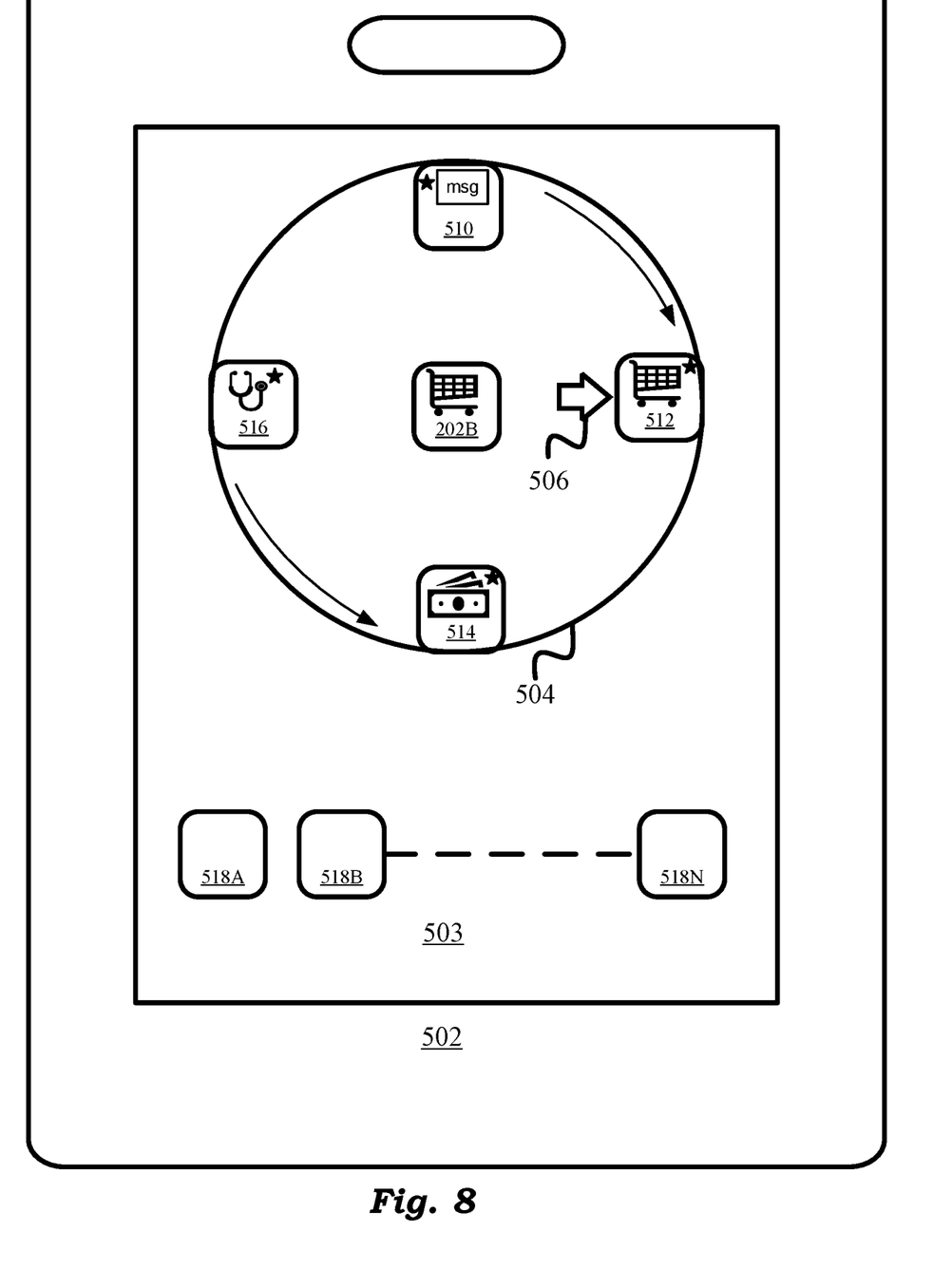
FIG. 8 shows an embodiment of the present technology with the selected/preferred application categories around a circle with an indicator and the highest-ranking selected/preferred application at the center of the circle.

Different parts of the outer circle may be designated to represent different categories of applications within which the applications are selected per above. FIG. 8 shows such an embodiment. Specifically, FIG. 8 shows a device 502 with a display 503 displaying an outer circle 504 and indicator 506 discussed above. 12:00 position on circle 504 is reserved for selected/preferred messaging applications 510, 3:00 is reserved for selected/preferred shopping applications 512, 6:00 for selected/preferred money/financial applications 514 and 9:00 for recommended or selected or preferred healthcare applications 516. Display 503 also shows the overall applications 518A, 518B, . . . 518N installed on device 502, whether preloaded or added by the user.

In a variation, circle 504 is represented by a three-dimensional (3D) sphere and the user is able to spin or rotate the sphere with a swipe on the touchscreen. This representation allows for more categories of applications to be represented and navigated graphically. In a further variation, while employing appropriate viewing environments, such a circle or sphere may be projected holographically as coming out of the screen in three dimensions (3D).

The above teachings are provided as reference to those skilled in the art in order to explain the salient aspects of the invention. It will be appreciated from the above disclosure that a range of variations on the above-described examples and embodiments may be practiced by the skilled artisan without departing from the scope of the invention(s) herein described. The scope of the invention should therefore be judged by the appended claims and their equivalents.

What is claimed is:

1. A computer-implemented method of selecting a subset of applications for a user from a plurality of applications on a mobile computing device, said method comprising a microprocessor executing program instructions stored in a computer-readable non-transitory storage medium, and said method comprising the steps of:

(a) performing a biometric authentication of said user on said mobile computing device, said biometric authentication including one or more of a facial recognition, a fingerprint recognition, an acoustic recognition and a chemical breath print recognition;

(b) accessing said mobile device by said user after said authentication, and installing by said user, at least one of said plurality of applications on said mobile computing device;

(a) providing a comparison engine for performing a similarity comparison of one or more context attributes of said plurality of applications with one or more context attributes of said user;
(b) deriving a rank-order of said plurality of applications based on said similarity comparison, said rank-order used for presenting said subset of applications as icons on a display of said computing device;
(c) providing an interface module for selecting and subsequently using one or more of said subset of applications;
(d) providing a digital wallet for storing reward points with a designated cash value;
(e) awarding said reward points to said user for purchasing a first product or a service from a first application and for not purchasing a product or a service from a second application, said first application and said second application belonging to said subset of applications.

2. The method of claim 1 with said context attributes of said user comprising one or more of a spending history, a usage, a location and a profile of said user.

3. The method of claim 1 assigning weights to said context attributes of said plurality of applications and said context attributes of said user.

4. The method of claim 3 representing said attributes with said weights assigned, as a vector.

5. The method of claim 3 performing said assigning by one or both of a human curator and a machine learning algorithm.

6. The method of claim 3 basing said weights on one or more of a user preference, a usage, a value of said reward points and a sponsor promotion for one or more of said plurality of applications.

7. The method of claim 1 wherein said presenting of said icons in said step (b) is based on said rank-order in one of a sequential manner, an alternating manner and around a circle with a movable indicator.

8. The method of claim 1 wherein said presenting of said icons in said step (b) is done on a 3D holographic sphere.

9. The method of claim 1 with said first application as a fitness application and said second application as a fast-food restaurant application.

10. The method of claim 1 with said plurality of applications comprising a messaging application, a shopping application, an entertainment application, a restaurant application, a weather application, a transportation application, a social networking application, a banking application, an education application, a healthcare application and a health insurance application.

11. A computer system for a selection of a subset of applications for a user from a plurality of applications on a mobile computing device, said system comprising a non-transitory storage medium storing computer-readable program instructions on said mobile device and a microprocessor coupled to said non-transitory storage medium for executing said program instructions, said computer system further comprising:
(a) a comparison engine that derives a rank-order of said plurality of applications based on a similarity comparison of one or more context attributes of said plurality of applications with one or more context attributes of said user, said context attributes assigned by a context assignor module, wherein said user undergoes a biometric authentication on said mobile computing device, said biometric authentication including one or more of a face recognition, a fingerprint recognition, an acoustic recognition and a chemical breath print recognition, and wherein said user accesses said mobile computing device after said biometric authentication;
(b) said rank-order used for presenting said subset of applications as icons on a display of said computing device;
(c) an interface module that enables a selection and subsequent usage of one or more of said subset of applications;
(d) a digital wallet that stores reward points for said user, said reward points having a designated cash value loaded on one of a debit card and a credit card; and
(e) said reward points awarded to said user for a purchase of a first product from a first application and for a non-purchase of a second product from a second application, said first application and said second application belonging to said subset of applications.

12. A context-aware mobile device system for selecting a subset of applications for a user of a mobile computing device from a plurality of applications installed on said mobile computing device, said context-aware mobile device system comprising a frontend portion and a backend portion, said frontend and backend portions comprising:
(a) respective frontend and backend non-transitory storage media storing respective computer-readable program instructions and respective frontend and backend microprocessors coupled to said respective non-transitory storage media for executing said respective program instructions, said respective frontend and backend microprocessors configured to:
(b) perform a similarity comparison of one or more context attributes of said plurality of applications with one or more context attributes of said user, wherein said user undergoes an authentication on said mobile computing device, said authentication including one or more of a pass-code based authentication, a facial recognition, a fingerprint recognition, an acoustic recognition and a chemical breath print recognition, and wherein said user accesses said mobile computing device after said authentication and installs on it at least one of said plurality of applications;
(c) derive a rank-order of said plurality of applications based on said similarity comparison, said rank-order used for presenting said subset of applications as icons on a display of said computing device;
(d) provide an interface for said selecting and using by said user, of one or more of said subset of applications;
(e) provide a digital wallet for storing reward points with a designated cash value; and
(f) award said reward points to said user for purchasing a first product using a first application and for not purchasing a second product using a second application, said first application and said second application belonging to said subset of applications.

13. The context-aware mobile device system of claim 12 wherein said first application is a fitness application and said second application is a fast-food restaurant application.

14. The context-aware mobile device system of claim wherein said plurality of applications comprise a messaging application, a shopping application, an entertainment application, a restaurant application, a weather application, a transportation application, a social networking application, a banking application, an education application, a healthcare application and a health insurance application.

15. The context-aware mobile device system of claim 12 wherein said context attributes of said user comprise one or more of a spending history, a usage, a location information and a biometrically generated profile of said user.

16. The context-aware mobile device system of claim 12 wherein weights are assigned to said context attributes of said plurality of applications and said context attributes of said user.

17. The context-aware mobile device system of claim 16 wherein said weights are assigned by one or both of a human curator and a machine learning algorithm.

18. The context-aware mobile device system of claim 16 wherein said weights are based on one or more of a user preference, a usage, value of said reward points and a sponsor promotion for one or more of said plurality of applications.

19. The context-aware mobile device system of claim 12 wherein said presenting of said icons in element (c) is done based on said rank-order, in one of a sequential manner, an alternating manner and around a circle with a movable indicator.

20. The context-aware mobile device system of claim 12 wherein said presenting of said icons in element (c) is done on a 3D holographic sphere.

\* \* \* \* \*